United States Patent
Fujinuma

(10) Patent No.: US 10,754,143 B2
(45) Date of Patent: *Aug. 25, 2020

(54) OPTICAL SCANNING METHOD AND OPTICAL SCANNING APPARATUS

(71) Applicant: OLYMPUS CORPORATION, Tokyo (JP)

(72) Inventor: Ken Fujinuma, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 134 days.

This patent is subject to a terminal disclaimer.

(21) Appl. No.: 15/868,352

(22) Filed: Jan. 11, 2018

(65) Prior Publication Data

US 2018/0136455 A1 May 17, 2018

Related U.S. Application Data

(63) Continuation of application No. PCT/JP2015/004088, filed on Aug. 18, 2015.

(51) Int. Cl.
*G02B 23/24* (2006.01)
*G02B 26/10* (2006.01)

(52) U.S. Cl.
CPC ..... *G02B 23/2469* (2013.01); *G02B 23/2423* (2013.01); *G02B 26/10* (2013.01); *G02B 26/103* (2013.01)

(58) Field of Classification Search
CPC ............ G02B 23/2469; G02B 23/2423; G02B 26/10; G02B 26/103
USPC ...................... 359/199.3, 199.4, 200.7, 200.8
See application file for complete search history.

(56) References Cited

U.S. PATENT DOCUMENTS

| | | | |
|---|---|---|---|
| 6,845,190 B1* | 1/2005 | Smithwick | A61B 1/0008 385/1 |
| 7,907,765 B2* | 3/2011 | Fauver | G01N 15/147 382/131 |
| 9,285,582 B2* | 3/2016 | Ito | G02B 23/26 |
| 9,612,435 B2* | 4/2017 | Shimamoto | G02B 21/0044 |
| 9,629,517 B2* | 4/2017 | Sakai | A61B 1/00172 |

(Continued)

FOREIGN PATENT DOCUMENTS

| JP | 2006189592 A | * | 7/2006 |
|---|---|---|---|
| JP | 2011036592 A | * | 2/2011 |

(Continued)

OTHER PUBLICATIONS

WIPO Translation of JP 2006-189592, from https://patentscope.wipo.int, performed on Jul. 17, 2019.*

(Continued)

*Primary Examiner* — Jennifer D. Carruth
(74) *Attorney, Agent, or Firm* — Scully, Scott, Murphy & Presser, P.C.

(57) ABSTRACT

An optical scanning method includes detecting a resonance frequency of a tip of a fiber while sweeping a vibration frequency of the tip of the fiber over a predetermined frequency range, the tip of the fiber being supported to allow oscillation, determining a driving frequency of the tip of the fiber on the basis of the detected resonance frequency, and scanning light over an object by causing the light to be emitted from the tip of the fiber while driving and vibrating the tip of the fiber at the driving frequency.

14 Claims, 10 Drawing Sheets

(56) References Cited

U.S. PATENT DOCUMENTS

| | | | | |
|---|---|---|---|---|
| 9,766,451 | B2* | 9/2017 | Shimamoto | G02B 23/2469 |
| 2002/0064341 | A1* | 5/2002 | Fauver | G02B 6/241 |
| | | | | 385/25 |
| 2007/0035799 | A1* | 2/2007 | Gomi | G02B 26/105 |
| | | | | 359/213.1 |
| 2008/0265178 | A1* | 10/2008 | Johnston | A61B 1/00172 |
| | | | | 250/492.1 |
| 2009/0015894 | A1* | 1/2009 | Rosman | A61B 5/0062 |
| | | | | 359/199.1 |
| 2009/0316116 | A1* | 12/2009 | Melville | A61B 1/0008 |
| | | | | 353/31 |
| 2010/0322494 | A1* | 12/2010 | Fauver | G01N 15/147 |
| | | | | 382/131 |
| 2011/0201941 | A1* | 8/2011 | Van Gaal | A61B 5/0062 |
| | | | | 600/476 |
| 2014/0177021 | A1* | 6/2014 | Shimamoto | G02B 21/0044 |
| | | | | 359/200.7 |
| 2015/0126858 | A1* | 5/2015 | Choi | A61B 1/07 |
| | | | | 600/425 |
| 2016/0025966 | A1* | 1/2016 | Shimamoto | G02B 23/26 |
| | | | | 359/199.4 |
| 2018/0064323 | A1* | 3/2018 | Fujinuma | A61B 1/00096 |
| 2019/0004233 | A1* | 1/2019 | Shimamoto | G02B 23/24 |

FOREIGN PATENT DOCUMENTS

| | | | |
|---|---|---|---|
| JP | 4672023 B2 | | 4/2011 |
| JP | 2015-075685 A | | 4/2015 |
| JP | 2015075685 A | * | 4/2015 |
| WO | WO 2006/071216 A1 | | 7/2006 |

OTHER PUBLICATIONS

WIPO Translation of JP 2011-36592, from https://patentscope.wipo.int, performed on Jul. 17, 2019.*

WIPO Translation of JP 2015-75685, from https://patentscope.wipo.int, performed on Jul. 17, 2019.*

J-Plat Pat Translation of JP 2015-75685, from https://www.j-platpat.inpit.go.jp, performed on Jul. 18, 2019.*

International Preliminary Report on Patentability dated Mar. 1, 2018 together with the Written Opinion received in related International Application No. PCT/JP2015/004088.

International Search Report dated Oct. 20, 2015 issued in PCT/JP2015/004088.

* cited by examiner

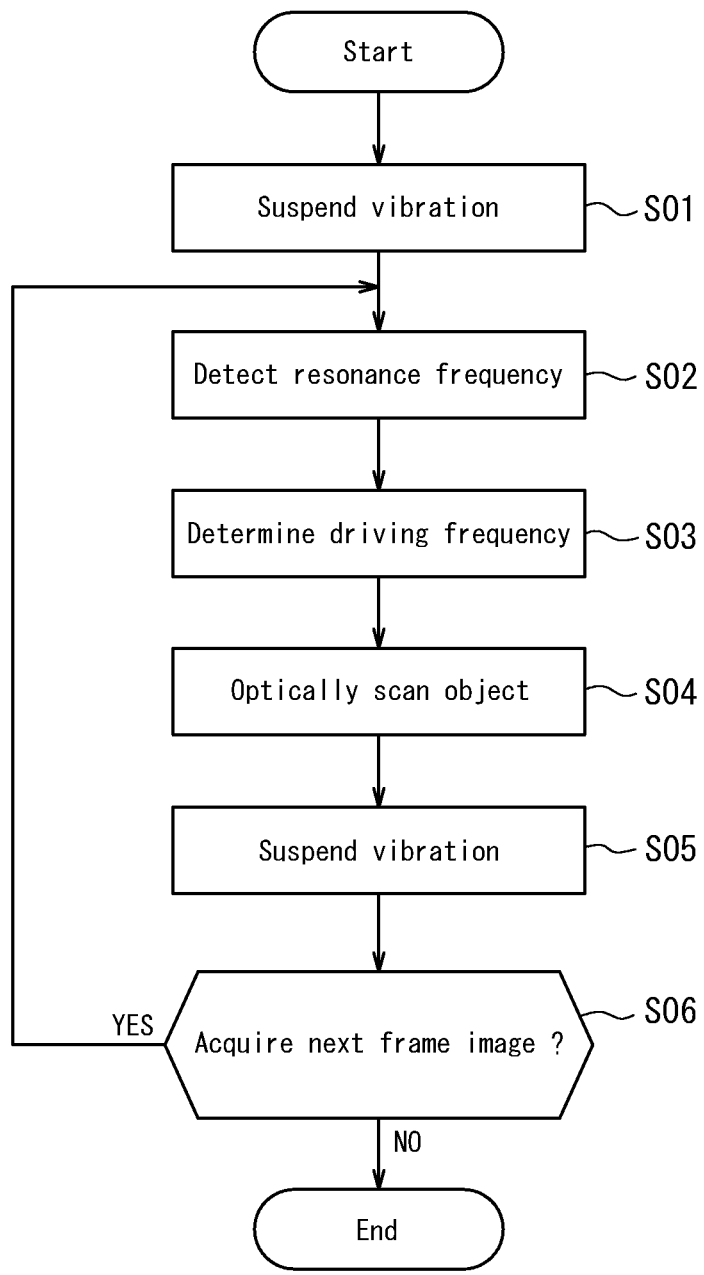

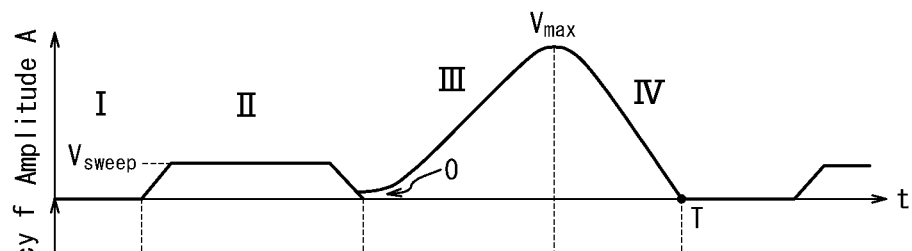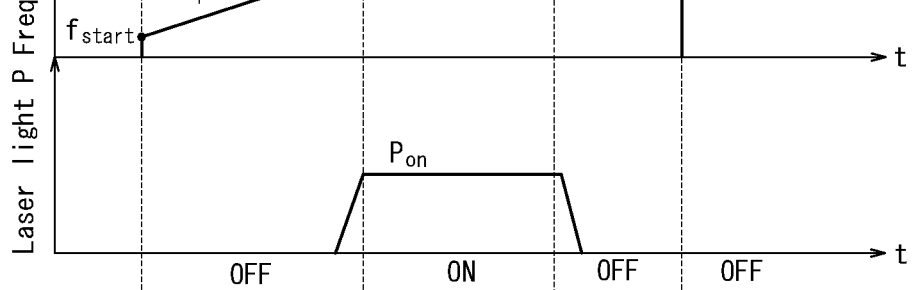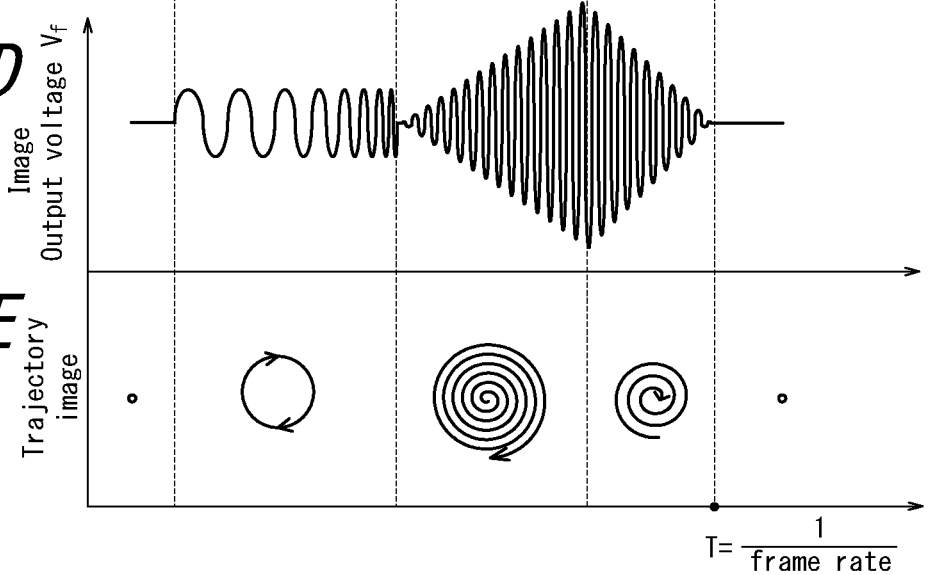

OPTICAL SCANNING METHOD AND OPTICAL SCANNING APPARATUS

CROSS-REFERENCE TO RELATED APPLICATION

The present application is a Continuing Application based on International Application PCT/JP2015/004088 filed on Aug. 18, 2015, the entire disclosure of which is incorporated herein by reference.

TECHNICAL FIELD

The present disclosure relates to an optical scanning method and an optical scanning apparatus that optically scan an object by vibrating an optical fiber.

BACKGROUND

An optical scanning observation apparatus that scans a beam of light from the end of an optical fiber over an object and detects light that is reflected, scattered, or the like by the object or detects fluorescent light or the like generated by the object is known (for example, see patent literature (PTL) 1). For such an apparatus to scan the irradiated light over the object, an end of the optical fiber is supported to allow oscillation of the tip where light is emitted, and the optical fiber is vibrated by disposing a piezoelectric element near the support.

Typical known methods of scanning an optical fiber include spiral scanning, in which the spot of irradiated light is scanned to trace a spiral, and raster scanning, in which the optical fiber is vibrated at high speed in one direction while being moved in an orthogonal direction at low speed. In a typical spiral scanning pattern, the vibration frequency is set to the resonance frequency. During raster scanning, the optical fiber is preferably vibrated at the resonance frequency in the direction of vibration at high speed. Therefore, the fiber has been driven to vibrate on the basis of the resonance frequency that is determined by the design values of the optical scanning observation apparatus.

CITATION LIST

Patent Literature

PTL 1: JP 4672023 B2

SUMMARY

An optical scanning method according to an aspect of the present disclosure includes:

detecting a resonance frequency of a tip of a fiber while sweeping a vibration frequency of the tip of the fiber over a predetermined frequency range, the tip of the fiber being supported to allow oscillation;

determining a driving frequency of the tip of the fiber on the basis of the detected resonance frequency; and scanning light over an object by causing the light to be emitted from the tip of the fiber while driving and vibrating the tip of the fiber at the driving frequency.

The scanning may be consecutively repeated a plurality of times after detecting the resonance frequency and determining the driving frequency once. Alternatively, the detecting of the resonance frequency and the determining of the driving frequency may be performed before the scanning each time the scanning is performed.

An abnormality is preferably detected as having occurred when the resonance frequency cannot be detected during the detecting of the resonance frequency.

The resonance frequency may be detected by detecting a phase difference between a current signal and a voltage signal for the driving and vibrating of the tip of the fiber.

An optical scanning method according to an aspect of the present disclosure includes:

detecting a resonance frequency of a tip of a fiber by detecting a phase difference between a current signal and a voltage signal for driving and vibrating the tip of the fiber, the tip of the fiber being supported to allow oscillation;

determining a driving frequency of the tip of the fiber on the basis of the detected resonance frequency; and scanning light over an object by causing the light to be emitted from the tip of the fiber while performing the driving and vibrating of the tip of the fiber at the driving frequency.

The resonance frequency is preferably detected while sweeping a vibration frequency of the tip of the fiber over a predetermined frequency range.

The scanning may be consecutively repeated a plurality of times after detecting the resonance frequency and determining the driving frequency once. Alternatively, the detecting of the resonance frequency and the determining of the driving frequency may be performed before the scanning each time the scanning is performed.

An abnormality is preferably detected as having occurred when the resonance frequency cannot be detected during the detecting of the resonance frequency.

An optical scanning apparatus according to an aspect of the present disclosure includes:

a fiber configured to guide light from a light source and emit the light from a tip of the fiber, the tip being supported to allow oscillation;

a driver configured to drive and vibrate the tip of the fiber;

a controller configured to sweep a vibration frequency of the tip of the fiber over a predetermined frequency range; and a resonance frequency detector configured to detect a resonance frequency of the tip of the fiber while the vibration frequency is being swept over the predetermined frequency range by the controller, wherein the controller determines a driving frequency of the tip of the fiber on the basis of the detected resonance frequency.

The resonance frequency detector may detect a phase difference between a current signal from a current detection circuit and a voltage signal from a voltage detection circuit, the current signal and the voltage signal being for the driver to drive and vibrate the tip of the fiber.

An optical scanning apparatus according to an aspect of the present disclosure includes:

a fiber configured to guide light from a light source and emit the light from a tip of the fiber, the tip being supported to allow oscillation;

a driver configured to drive and vibrate the tip of the fiber;

a resonance frequency detector configured to detect a resonance frequency of the tip of the fiber by detecting a phase difference between a current signal from a current detection circuit and a voltage signal from a voltage detection circuit, the current signal and the voltage signal being for the driver to drive and vibrate the tip of the fiber; and a controller configured to determine a driving frequency of the tip of the fiber on the basis of the detected resonance frequency.

The controller preferably sweeps a vibration frequency of the tip of the fiber over a predetermined frequency range, and the resonance frequency detector preferably detects the resonance frequency while the vibration frequency is being swept over the predetermined frequency range by the controller.

BRIEF DESCRIPTION OF THE DRAWINGS

In the accompanying drawings:

FIG. 6 is a flowchart for executing an optical scanning method according to the first embodiment;

FIG. 7A illustrates the amplitude A of the driving voltage over time in the optical scanning method according to the first embodiment;

FIG. 7B illustrates the frequency f of the driving voltage over time in the optical scanning method according to the first embodiment;

FIG. 7C illustrates the laser output P of the light source over time in the optical scanning method according to the first embodiment;

FIG. 7D illustrates an image of the waveform of the output voltage Vf over time in the optical scanning method according to the first embodiment;

FIG. 7E illustrates an image of the scanning trajectory of light at various points over time in the optical scanning method according to the first embodiment;

DETAILED DESCRIPTION

The resonance frequency is not constant, but rather varies depending on factors such as the manufacturing error in each optical scanning apparatus, external forces, temperature changes, and the passage of time. A change in the resonance frequency without any change in the frequency at which the fiber is driven leads to a change in the amplitude of the fiber and reduced energy efficiency of optical scanning. However, addressing this issue by measuring the resonance frequency for each individual optical scanning apparatus and/or upon each use complicates operation.

It would therefore be helpful to provide an optical scanning method and an optical scanning apparatus that can prevent a reduction in performance due to a shift in the resonance frequency of the fiber, caused by individual differences between apparatuses or by change over time, and that can appropriately adjust the driving frequency.

Embodiments of the present disclosure are described below with reference to the drawings.

Embodiment 1

Figure 1:
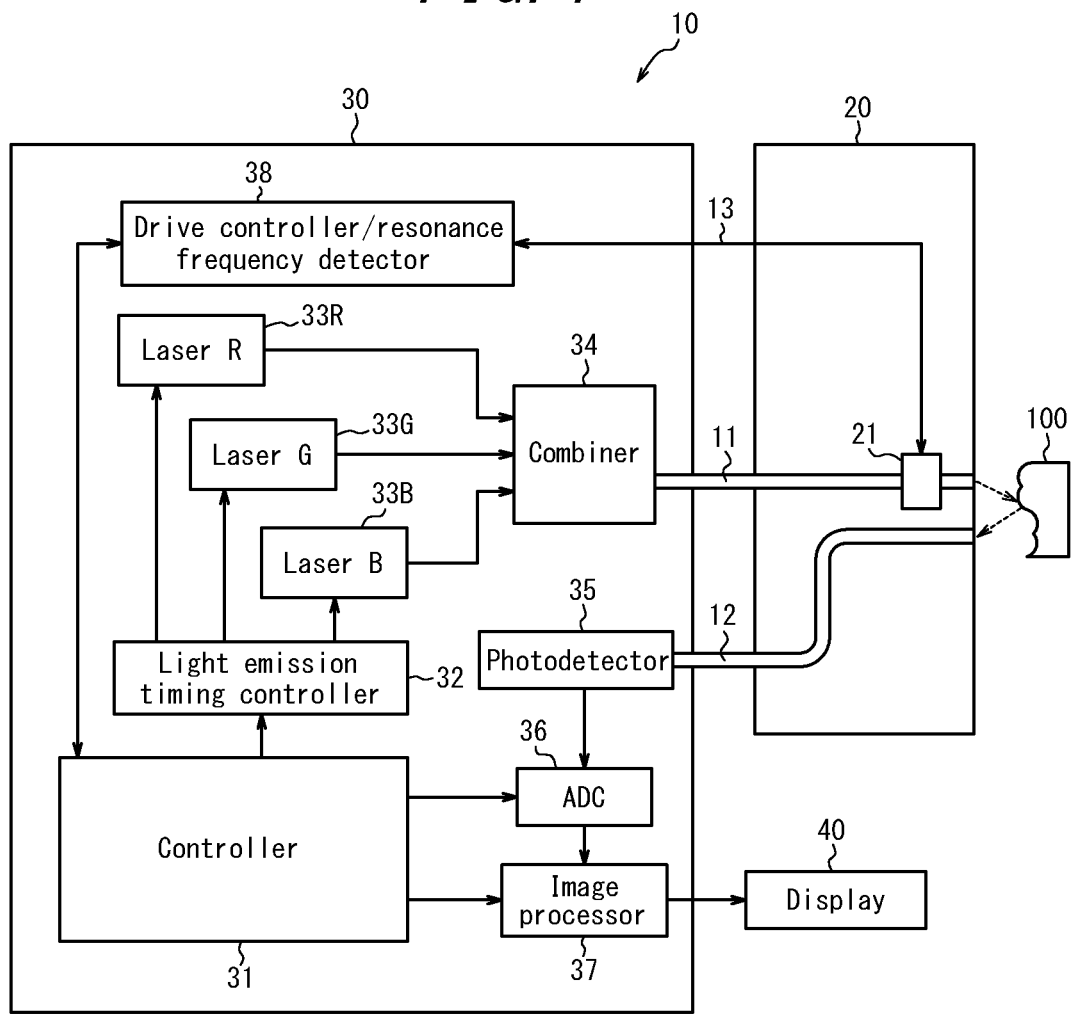
FIG. 1 is a block diagram schematically illustrating the configuration of an optical scanning endoscope apparatus that is an example of an optical scanning observation apparatus according to a first embodiment.

FIG. 1 is a block diagram schematically illustrating the structure of an optical scanning endoscope apparatus that is an example of an optical scanning apparatus according to a first embodiment. The optical scanning endoscope apparatus 10 includes a scope 20, a control device body 30, and a display 40.

The control device body 30 includes a controller 31 that controls the optical scanning endoscope apparatus 10 overall, a light emission timing controller 32, lasers 33R, 33G, and 33B, and a combiner 34. Under the control of the controller 31, the light emission timing controller 32 controls the light emission timing of the three lasers 33R, 33G, and 33B that emit laser light of three primary colors, i.e. red, green, and blue. For example, diode-pumped solid-state (DPSS) lasers or laser diodes may be used as the lasers 33R, 33G, and 33B. The laser light emitted from the lasers 33R, 33G, and 33B is combined by the combiner 34 and is incident as white illumination light on an optical fiber 11 for illumination, which is a single-mode fiber. The configuration of the light source in the optical scanning endoscope apparatus 10 is not limited to this example. A light source with one laser may be used, or a plurality of other light sources may be used. The lasers 33R, 33G, and 33B and the combiner 34 may be stored in a housing that is separate from the control device body 30 and is joined to the control device body 30 by a signal wire.

The optical fiber 11 for illumination is connected to the tip of the scope 20, and light incident on the optical fiber 11 for illumination from the combiner 34 is guided to the tip of the scope 20 and irradiated towards an object 100. By a driver 21 being driven to vibrate at that time, the illumination light emitted from the optical fiber 11 for illumination can perform a 2D scan on the observation surface of the object 100. The driver 21 is controlled by a drive controller/resonance frequency detector 38 of the below-described control device body 30. Signal light such as reflected light, scattered light, or fluorescent light that is obtained from the object 100 due to irradiation with the illumination light is received at the tip of an optical fiber bundle 12 for detection, constituted by a plurality of multi-mode fibers, and is guided through the scope 20 to the control device body 30.

The control device body 30 further includes a photodetector 35 for processing signal light, an analog-to-digital converter (ADC) 36, and an image processor 37. The photodetector 35 divides the signal light that passed through the optical fiber bundle 12 for detection into spectral components and converts the spectral components into electrical signals with a photodiode or the like. The ADC 36 converts the image signal, which was converted into an electrical signal, to a digital signal and outputs the result to the image processor 37. The controller 31 calculates information on the scanning position along the scan path on the basis of information such as the amplitude and phase of vibration voltage applied by the drive controller/resonance frequency detector 38 and provides the result to the image processor 37. The image processor 37 obtains pixel data on the object 100 at the scanning position from the digital signal output by the ADC 36. The image processor 37 sequentially stores information on the scanning position and the pixel data in a non-illustrated memory, generates an image of the object 100 by performing processing, such as interpolation, as necessary after completion of the scan or during the scan, and displays the image on the display 40.

In the above-described processing, the controller 31 synchronously controls the light emission timing controller 32, the photodetector 35, the drive controller/resonance frequency detector 38, and the image processor 37. The controller 31 and the image processor 37 are, for example, configured by a general-purpose or dedicated computer. Specifically, the computer includes an arithmetic processing device, such as a central processing unit (CPU), large scale integrated (LSI) circuit, or field-programmable gate array (FPGA); a main memory device such as read-only memory (RAM); and an auxiliary memory device, such as a hard disk, storing a control program and an image generation program. The CPU implements the processing of the above-described controller 31 by the control program being loaded into the main memory device from the auxiliary memory device and executed. The arithmetic processing device implements the processing of the above-described image processor 37 in accordance with the image processing program by the image processing program being loaded into the main memory device from the auxiliary memory device and executed.

Figure 2:
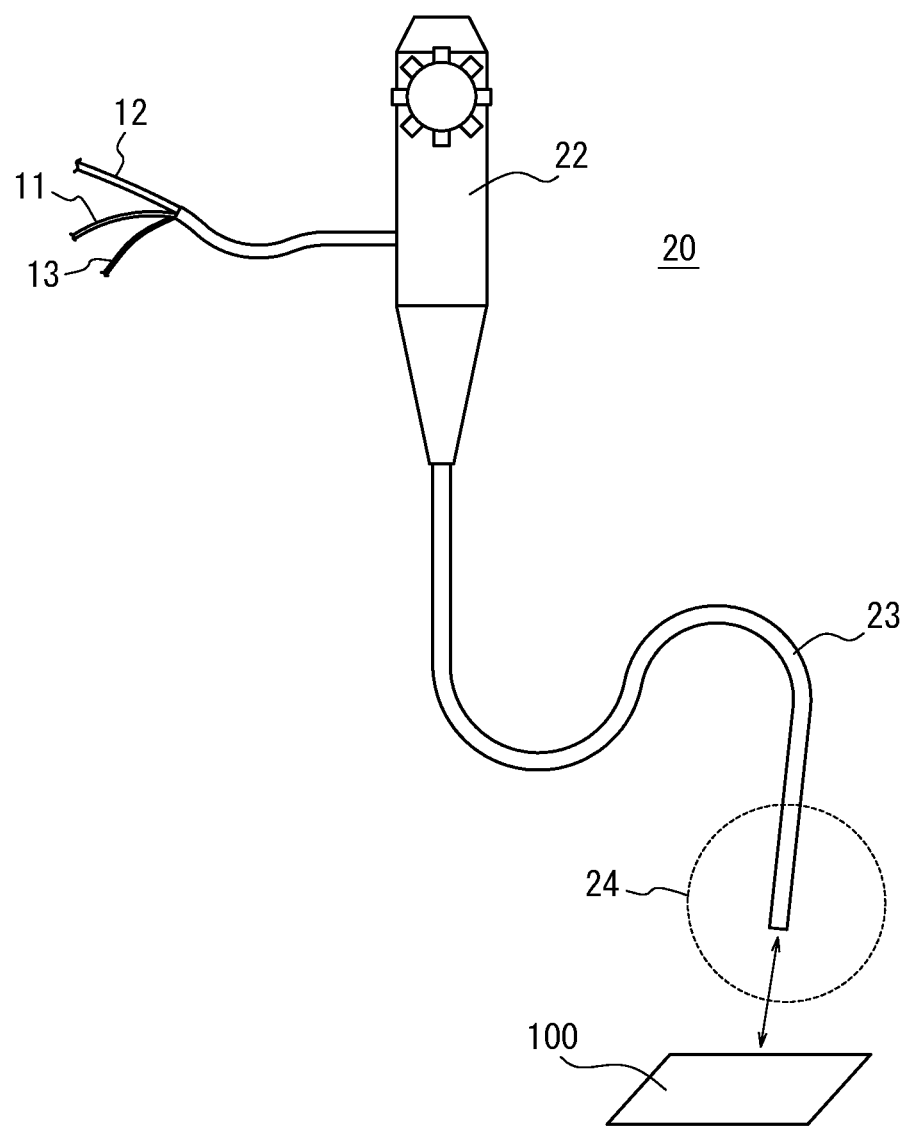
FIG. 2 is a schematic overview of the scope of the optical scanning endoscope in FIG. 1.

FIG. 2 is a schematic overview of the scope 20. The scope 20 includes an operation part 22 and an insertion part 23. The optical fiber 11 for illumination, the optical fiber bundle 12 for detection, and wiring cables 13 extending from the control device body 30 are each connected to the operation part 22. The optical fiber 11 for illumination, optical fiber bundle 12 for detection, and wiring cables 13 pass through the insertion part 23 and are lead to a tip 24 (the portion within the dotted circle in FIG. 2) of the insertion part 23.

Figure 3:
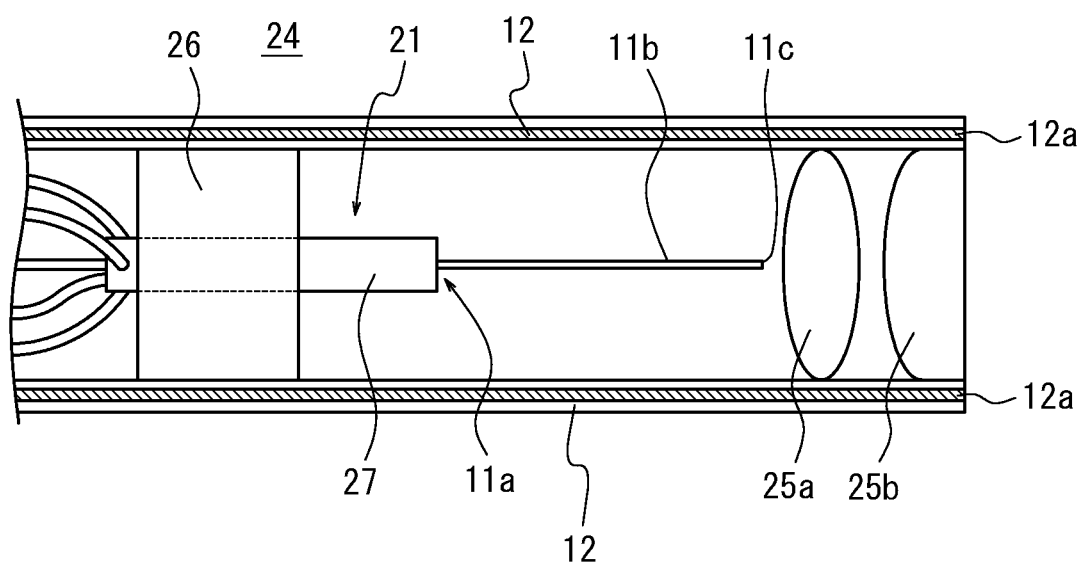
FIG. 3 is a cross-sectional diagram of the tip of the scope in FIG. 2.

FIG. 3 is a cross-sectional diagram illustrating an enlargement of the tip 24 of the insertion part 23 of the scope 20 in FIG. 2. The tip 24 includes the driver 21, projection lenses 25a and 25b, the optical fiber 11 for illumination, which passes through the central portion, and the optical fiber bundle 12 for detection, which passes through the peripheral portion.

The driver 21 includes an actuator tube 27, fixed to the inside of the insertion part 23 of the scope 20 by an attachment ring 26, along with a fiber holding member 29 and piezoelectric elements 28a to 28d (see FIGS. 4A and 4B) disposed inside the actuator tube 27. The optical fiber 11 for illumination is supported by the fiber holding member 29, and the portion from a fixed end 11a supported by the fiber holding member 29 to the tip 11c is an oscillating part 11b that is supported to allow oscillation. The optical fiber bundle 12 for detection is disposed to pass through the peripheral portion of the insertion part 23 and extends to the end of the tip 24. A non-illustrated detection lens is also provided at the tip of each fiber in the optical fiber bundle 12 for detection.

Furthermore, the projection lenses 25a and 25b and the detection lenses are disposed at the extreme end of the tip 24. The projection lenses 25a and 25b are configured so that laser light emitted from the tip 11c of the optical fiber 11 for illumination is roughly concentrated on the object 100. The detection lenses are disposed so that light resulting from laser light concentrated on the object 100, e.g. light that is reflected, scattered, refracted, or the like by the object 100 (light that interacts with the object 100) or fluorescent light, is captured as signal light, concentrated on the optical fiber bundle 12 for detection disposed behind the detection lenses, and combined. The projection lenses are not limited to a double lens structure and may be structured as a single lens or as three or more lenses.

Figure 4A:
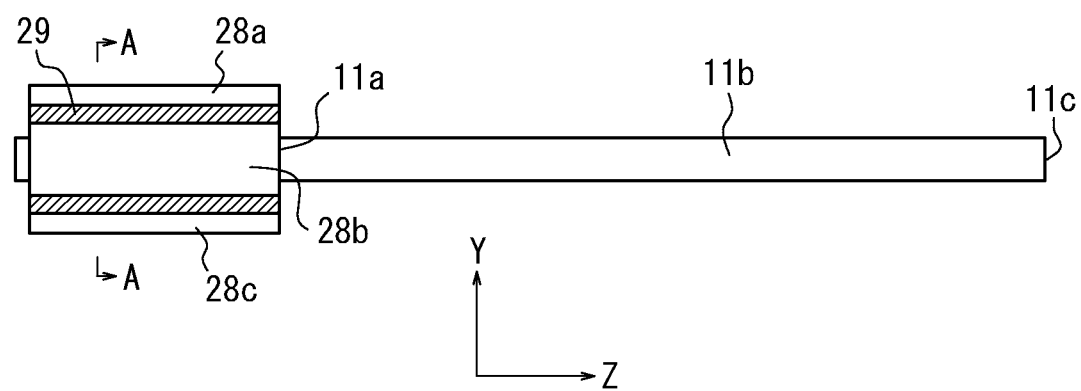
FIG. 4A is a side view illustrating the driver of the optical scanning endoscope apparatus and the oscillating portion of the optical fiber for illumination.
Figure 4B:
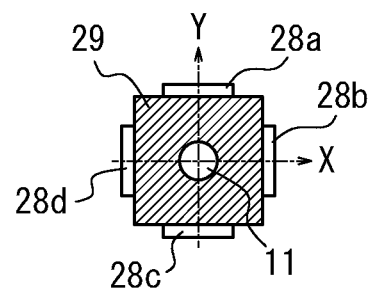
FIG. 4B is a cross-section along the A-A line in FIG. 4A.

FIG. 4A illustrates the mechanism for driving the driver 21 of the optical scanning endoscope apparatus 10 to vibrate and illustrates the oscillating part 11b of the optical fiber 11 for illumination. FIG. 4B is a cross-sectional diagram along the A-A line in FIG. 4A. The optical fiber 11 for illumination passes through the center of the fiber holding member 29, which has a prismatic shape, and is thereby firmly held by the fiber holding member 29. The four sides of the fiber holding member 29 respectively face the +Y and +X directions and the directions opposite thereto. A pair of piezoelectric elements 28a and 28c for driving in the Y direction are fixed onto the fiber holding member 29 in the +Y direction and the −Y direction, and a pair of piezoelectric elements 28b and 28d for driving in the X direction are fixed in the +X direction and the −X direction.

The wiring cables 13 from the drive controller/resonance frequency detector 38 of the control device body 30 are connected to the piezoelectric elements 28a to 28d.

Figure 5:
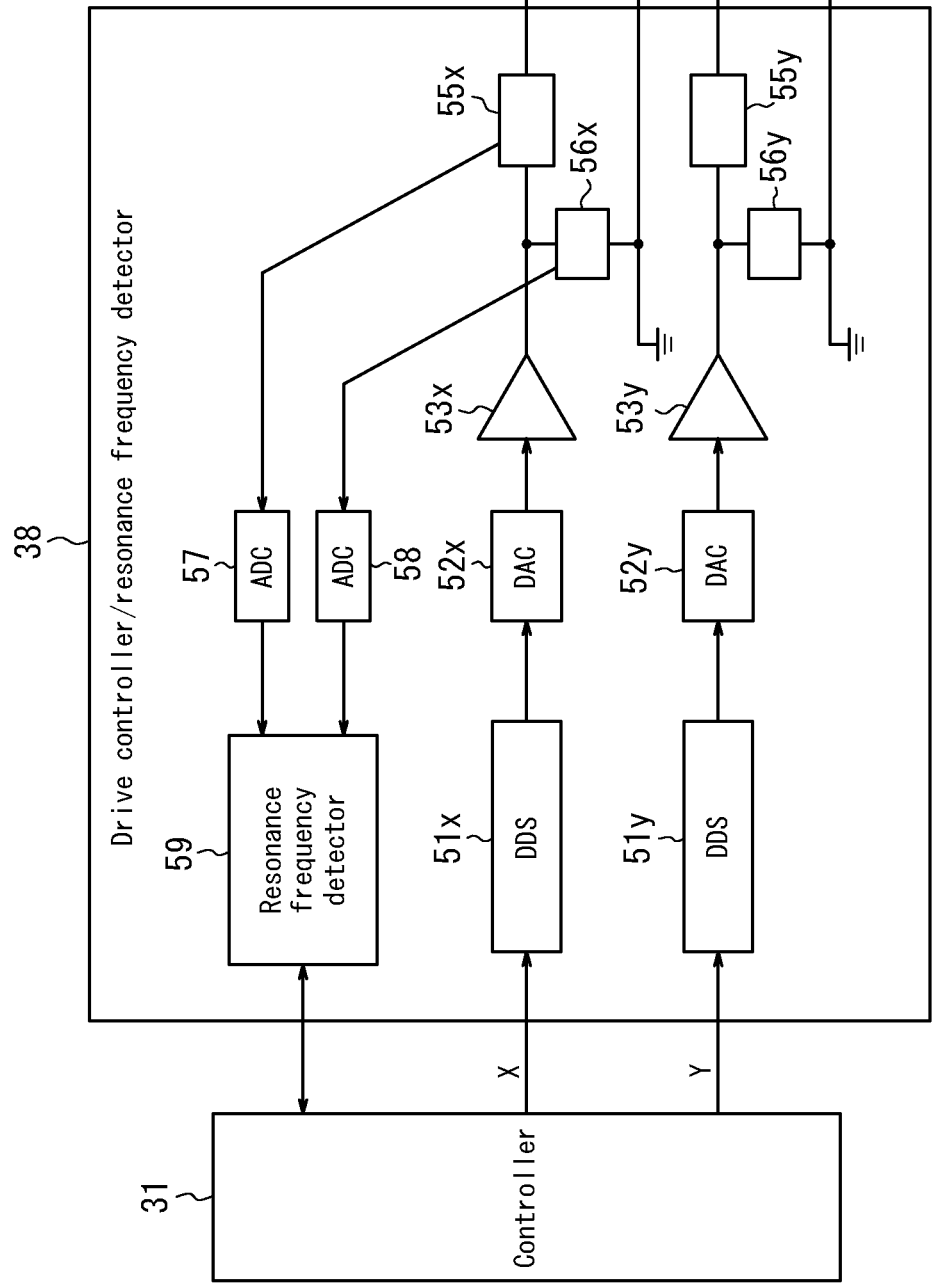
FIG. 5 is a block diagram schematically illustrating the structure of the drive controller/resonance frequency detector in FIG. 1.

FIG. 5 is a block diagram schematically illustrating the structure of the drive controller/resonance frequency detector 38. In order to drive the piezoelectric elements 28a to 28d of the driver 21, the drive controller/resonance frequency detector 38 includes digital direct synthesizers (DDSs) 51x, 51y, digital-to-analog converters (DACs) 52x and 52y, and amplifiers 53x and 53y. The DDS 51x and DDS 51y receive respective control signals from the controller 31 and generate a digital drive signal waveform. The resulting signal is converted to an analog signal by the DACs 52x and 52y, amplified by the amplifiers 53x and 53y, and used to drive the piezoelectric elements 28a to 28d positioned at the tip 24 of the scope 20 via the wiring cables 13.

In practice, voltage of equivalent magnitude and opposite sign is always applied across the piezoelectric elements 28b and 28d in the X direction. Similarly, voltage of equivalent magnitude and opposite sign is always applied across the piezoelectric elements 28a and 28c in the Y direction. One of the piezoelectric elements 28b and 28d disposed opposite each other with the fiber holding member 29 therebetween expands and the other contracts, causing the fiber holding member 29 to flex. Repeating this operation produces vibration in the X direction. The same is true for vibration in the Y direction as well.

The drive controller/resonance frequency detector 38 can drive and vibrate the piezoelectric elements 28b and 28d for driving in the X direction and the piezoelectric elements 28a and 28c for driving in the Y direction by applying vibration voltage of the same frequency or vibration voltage of different frequencies thereto. Upon driving and vibrating the piezoelectric elements 28a and 28c for driving in the Y direction and the piezoelectric elements 28b and 28d for driving in the X direction, the oscillating part 11b of the optical fiber 11 for illumination illustrated in FIG. 3 and FIG. 4A vibrates, and the tip 11c is deflected, so that the laser light emitted from the tip 11c sequentially scans the surface of the object 100.

The oscillating part 11b of the optical fiber 11 for illumination is driven to vibrate at the resonance frequency in one or both of the X direction and the Y direction. The resonance frequency of the oscillating part 11b, however, changes with environmental conditions and changes over time. Therefore, the drive controller/resonance frequency detector 38 includes a mechanism for resonance frequency detection that detects the resonance frequency of the oscillating part 11*b* of the optical fiber 11 for illumination. As illustrated in FIG. 5, the mechanism for resonance frequency detection includes a current detection circuit 55*x* and a voltage detection circuit 56*x* provided on the circuit that extends from an amplifier 53*x* to the piezoelectric elements 28*b* and 28*d*; ADCs 57 and 58 that convert the current signal and voltage signal detected by the detection circuits to digital signals, and a resonance frequency detector 59 that detects the resonance frequency of vibration in the X direction from the phase difference between the output signals of the ADC 57 and ADC 58. In order to detect the resonance frequency of vibration in the Y direction, a current detection circuit 55*y* and a voltage detection circuit 56*y* are similarly provided, and the output of these detection circuits is also input into the resonance frequency detector 59 via ADCs (not illustrated). The resonance frequency detector 59 is, for example, configured by a general-purpose or dedicated computer. Specifically, the computer includes an arithmetic processing device, such as a CPU, LSI circuit, or FPGA; a main memory device such as RAM; and an auxiliary memory device, such as a hard disk, storing a resonance frequency detection program. The arithmetic processing device implements the processing of the above-described resonance frequency detector 59 in accordance with the resonance frequency detection program by the resonance frequency detection program being loaded into the main memory device from the auxiliary memory device and executed.

With reference to FIG. 6 and FIGS. 7A to 7E, operations of the optical scanning endoscope apparatus 10 are now described. FIG. 6 is a flowchart for executing an optical scanning method according to the first embodiment. FIG. 7A to FIG. 7E illustrate the optical scanning method according to the first embodiment over time, with FIG. 7A illustrating the amplitude A of the driving voltage, FIG. 7B illustrating the frequency f of the driving voltage, FIG. 7C illustrating the laser output P of the light source, FIG. 7D illustrating an image of the waveform of the output voltage Vf, and FIG. 7E illustrating an image of the scanning trajectory of light at various time points.

First, the initial state is a state in which operation of the oscillating part 11*b* of the optical fiber 11 for illumination is suspended (step S01). This state is represented as period I in FIGS. 7A to 7E.

Next, the controller 31 starts a resonance frequency detection step to detect the resonance frequency (step S02). The resonance frequency detection step corresponds to period II in FIG. 7A to FIG. 7E. In period II, vibration voltage with an amplitude A equivalent to a predetermined amplitude $V_{sweep}$, a phase that is shifted by 90° between the X and Y directions, and a frequency f that increases over time is applied to the piezoelectric elements 28*b* and 28*d* in the X direction and the piezoelectric elements 28*a* and 28*c* in the Y direction (see FIGS. 7A, 7B, and 7D). As a result, the vibration frequency of the tip 11*c* of the optical fiber 11 for illumination is swept over a predetermined frequency range. The predetermined frequency range is predicted in advance as a range that is around the resonance frequency at the time of design and over which the resonance frequency can vary. At this time, the lasers 33R, 33G, and 33B are not yet turned on (FIG. 7C). As a result, the tip 11*c* of the optical fiber 11 for illumination vibrates so as to trace a circle (FIG. 7E).

Figure 8A:
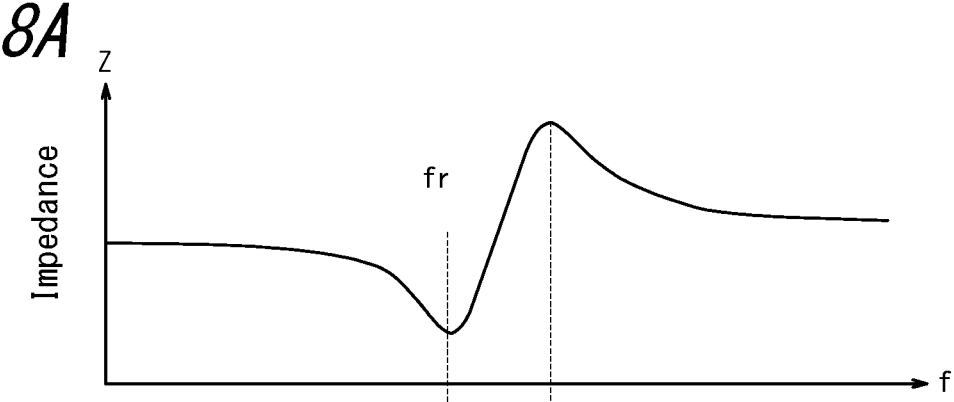
FIG. 8A illustrates the typical frequency characteristics of impedance.
Figure 8B:
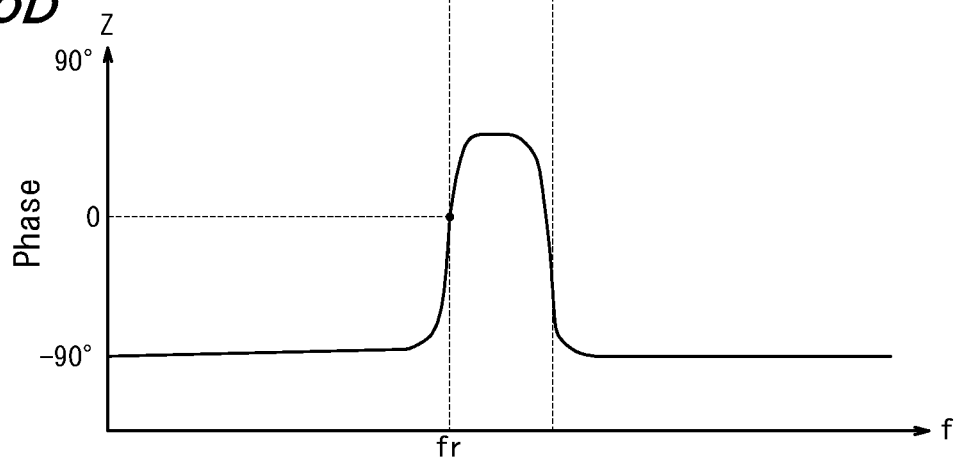
FIG. 8B illustrates the typical frequency characteristics of phase shift.

While the frequency of the driving voltage is increasing, the current signal and voltage signal respectively detected by the current detection circuits 55*x*, 55*y* and the voltage detection circuits 56*x*, 56*y* are monitored by the resonance frequency detector 59. The resonance frequency detector 59 detects the resonance frequency by detecting the phase shift of the current signal and the voltage signal. In general, the frequency characteristics of the phase shift for impedance and for current and voltage of the vibration circuit are known to be like those of FIG. 8A and FIG. 8B. As illustrated in FIG. 8A, during vibration at the resonance frequency, the impedance is minimized, and the phase shift is zero. Therefore, the resonance frequency detector 59 identifies the frequency fr at the time that the phase shift between the current signal from the current detection circuits 55*x*, 55*y* and the voltage signal from the voltage detection circuits 56*x*, 56*y* is zero as being the resonance frequency and outputs the resonance frequency to the controller 31.

The controller 31 determines the subsequent driving frequency to be near the detected resonance frequency fr (step S03). In other words, the controller 31 functions as a driving frequency determining unit that determines the driving frequency. The driving frequency allows driving at a frequency near the resonance frequency fr, but the driving frequency need not match fr exactly and may be a slightly different value. The driving frequency determination step to determine the driving frequency is performed during period II.

If the resonance frequency is not detected in the resonance frequency detection step (step S02), either there was no output from the resonance frequency detector 59 to the controller 31, or a signal detecting an abnormality was transmitted. In this case, the controller 31 determines that an abnormality has occurred, suspends the apparatus, and displays a warning indicating an abnormality on the display 40. Possible examples of when the resonance frequency is not detected include the optical fiber 11 for illumination being broken and an abnormality in the piezoelectric elements 28*a* to 28*d*.

Immediately before the end of period II, the controller 31 turns on the lasers 33R, 33G, and 33B. Next, as the scanning step, the object is optically scanned (step S04). In other words, in period III, the controller 31 fixes the driving frequency f of the voltage applied to the piezoelectric elements 28*b* and 28*d* in the X direction and the piezoelectric elements 28*a* and 28*c* in the Y direction at the resonance frequency fr (FIG. 7B) and increases the amplitude A of the driving voltage from zero to the maximum value Vmax over time (FIG. 7A). As a result, the light emitted from the optical fiber 11 for illumination follows a spiral trajectory in which the radius increases over time (FIG. 7E).

Next, once the amplitude A of the driving voltage has reached the maximum value Vmax, the controller 31 suspends oscillation of the lasers 33R, 33G, and 33B and also gradually suspends vibration of the optical fiber 11 for illumination (step S05). Vibration is suspended by rapidly decreasing the amplitude A of the driving voltage in period IV, which is shorter than period III. By the above-described spiral scanning, a circular region of the object 100 is scanned in 2D, and one frame of an image is acquired. In the case of acquiring the next frame, the controller 31 returns to step S02 again and repeats step S02 through step S05.

As described above, the optical scanning endoscope apparatus 10 detects the resonance frequency fr before scanning the object 100 and can acquire images by performing an optical scan of the target of detection at the resonance frequency fr. As a result, a reduction in performance due to a shift in the resonance frequency of the fiber, caused by individual differences between apparatuses or by change over time, can be prevented, and the driving frequency can be appropriately adjusted. Always driving the oscillating part 11b of the optical fiber 11 for illumination to vibrate at a frequency near the resonance frequency also allows scanning with good energy efficiency.

Furthermore, since the resonance frequency is detected before each image frame is acquired, the driving frequency can be adjusted to an appropriate value immediately if the resonance frequency changes for a reason such as a temperature increase during operation of the optical scanning endoscope apparatus 10. Acquisition and display of more stable images can also be expected, since the tip 11c of the optical fiber 11 for illumination always vibrates while tracing a stable trajectory.

When the resonance frequency cannot be detected in the resonance frequency detection step (step S02), the apparatus is suspended and a warning is issued, thereby allowing early detection of an abnormality in the apparatus and preventing failure or increased damage.

Instead of detecting the resonance frequency and determining the driving frequency for the second time onward after scanning is suspended in period IV, these operations may be performed by sweeping the vibration frequency f around the resonance frequency and detecting the resonance frequency while vibration is being reduced during period IV (step S05). In this case, optical scanning can start immediately after suspension of vibration (step S03), thereby increasing the frame rate and allowing acquisition of better images.

Embodiment 2

Figure 9A:
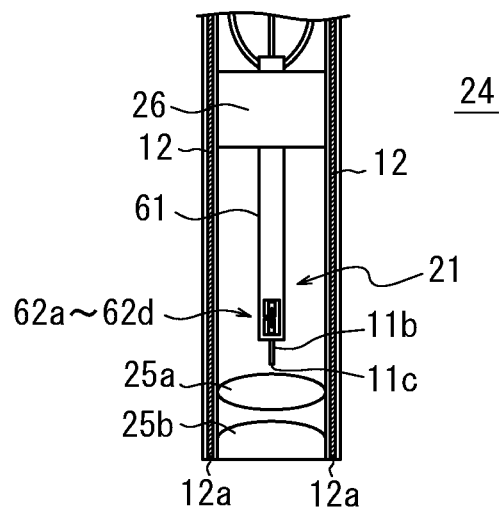
FIG. 9A is a cross-sectional diagram illustrating the tip of the optical scanning endoscope apparatus according to a second embodiment.
Figure 9B:
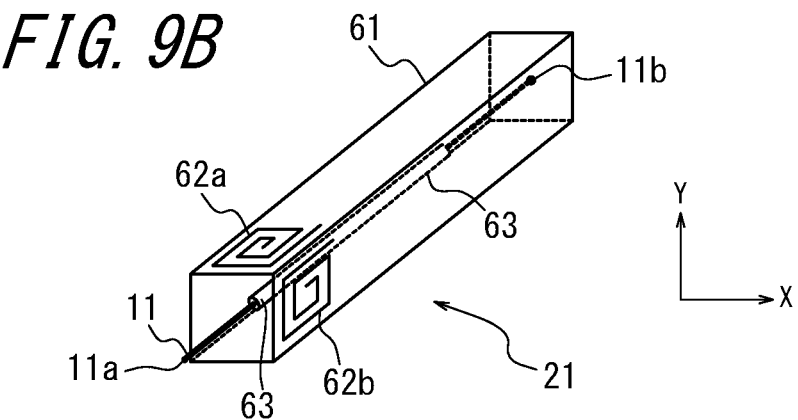
FIG. 9B is an enlarged perspective view of the driver in FIG. 9A.
Figure 9C:
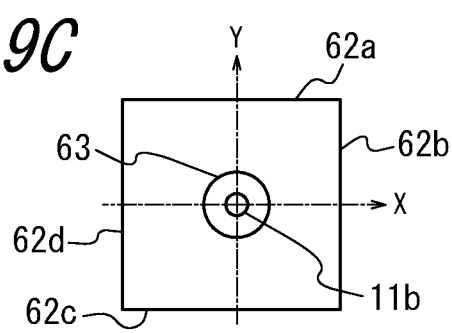
FIG. 9C is a cross-sectional diagram of a plane perpendicular to the axis of the optical fiber, illustrating a portion including the coils for generation of a deflecting magnetic field and the permanent magnet in FIG. 9B.

In a second embodiment, the driver 21 of the first embodiment is configured not with piezoelectric elements, but rather using a permanent magnet fixed to the optical fiber 11 for illumination and coils for generation of a deflecting magnetic field (electromagnetic coils) that drive the permanent magnet. FIG. 9A is a cross-sectional diagram illustrating the tip 24 of the scope 20 in the optical scanning endoscope apparatus 10 according to the second embodiment, FIG. 9B is an enlarged perspective view of the driver 21 in FIG. 9A, and FIG. 9C is a cross-sectional diagram of a plane perpendicular to the axis of the optical fiber 11 for illumination, illustrating a portion including coils 62a to 62d for generation of a deflecting magnetic field and a permanent magnet 63 in FIG. 9B.

At a portion of the oscillating part 11b of the optical fiber 11 for illumination, the permanent magnet 63, which is magnetized in the axial direction of the optical fiber 11 for illumination and includes a through-hole, is joined to the optical fiber 11 for illumination with the optical fiber 11 being passed through the through-hole. A square tube 61, one end of which is fixed to the attachment ring 26, is provided so as to surround the oscillating part 11b, and flat coils 62a to 62d for generation of a deflecting magnetic field are provided on the sides of the square tube 61 at a portion thereof opposing one pole of the permanent magnet 63.

The pair of coils 62a and 62c for generation of a deflecting magnetic field in the Y direction and the pair of coils 62b and 62d for generation of a deflecting magnetic field in the X direction are each disposed on opposing sides of the square tube 61, and a line connecting the center of the coil 62a for generation of a deflecting magnetic field with the center of the coil 62c for generation of a deflecting magnetic field is orthogonal to a line connecting the center of the coil 62b for generation of a deflecting magnetic field with the center of the coil 62d for generation of a deflecting magnetic field near the central axis of the square tube 61 when the optical fiber 11 for illumination is disposed therein at rest. These coils are connected to the drive controller/resonance frequency detector 38 of the control device body 30 via the wiring cable 13 and are driven by drive current from the drive controller/resonance frequency detector 38.

Figure 10:
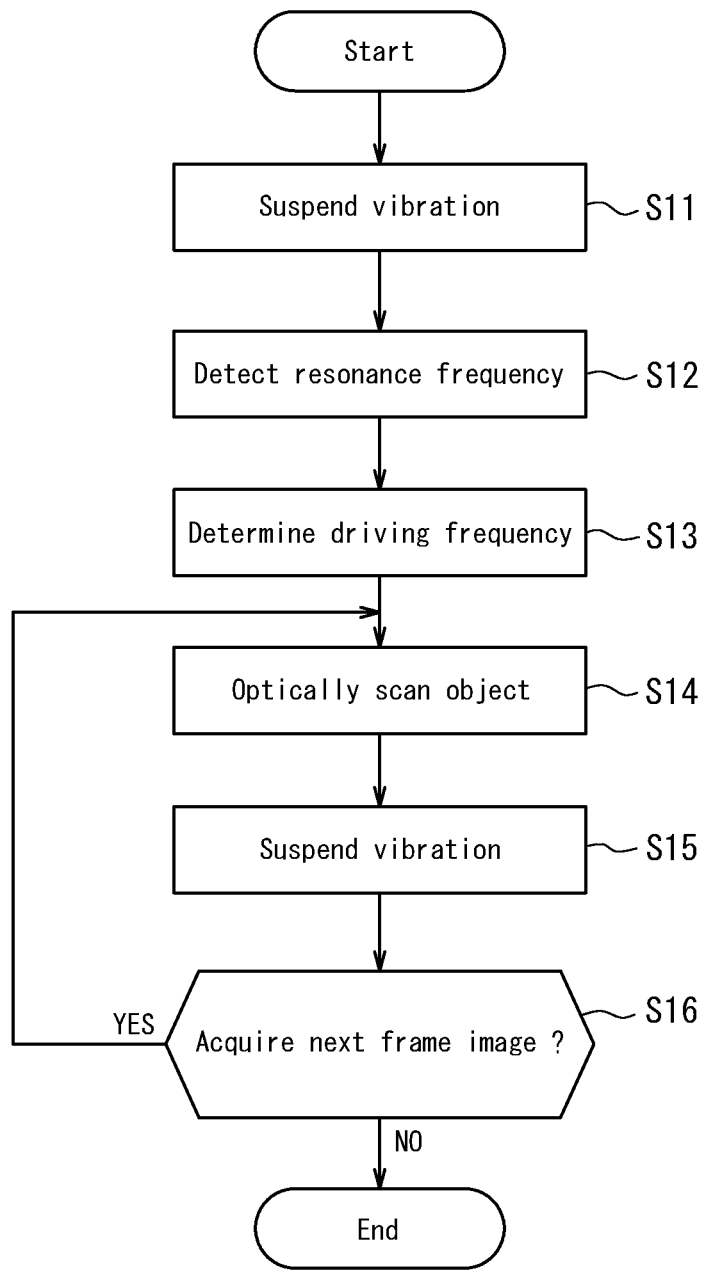
FIG. 10 is a flowchart for executing an optical scanning method according to the second embodiment.

Next, an optical scanning method in the second embodiment is described. FIG. 10 is a flowchart for executing an optical scanning method according to the second embodiment. Since the content of the steps in FIG. 10 is nearly the same as that of the steps in the first embodiment, the steps in FIG. 10 are indicated by adding 10 to the number of the corresponding steps in FIG. 6. In the present embodiment, however, after operation of the apparatus begins, the resonance frequency is detected (step S12) and the driving frequency determined (step S13) only once. Subsequently, acquisition of image data by optically scanning the object (step S14) is repeated until the controller 31 suspends acquisition of the next frame (step S16). Since the remaining configuration and effects are similar to those of the first embodiment, identical or corresponding constituent elements are labeled with the same reference signs, and a description thereof is omitted.

Since the present embodiment allows detection of the resonance frequency at the start of each operation, a reduction in performance due to a shift in the resonance frequency of the fiber, caused by individual differences between apparatuses or by change over time, can be prevented, and the driving frequency can be appropriately adjusted. Furthermore, after detecting the resonance frequency once, image frames can subsequently be acquired by repeated optical scanning. Therefore, endoscope images can be acquired at a higher frame rate than in the first embodiment.

The present disclosure is not limited to the above embodiments, and a variety of changes and modifications may be made. The method of optical scanning is not limited to spiral scanning and may also be applied to raster scanning. In this case, the optical fiber for illumination is only vibrated at the resonance frequency in one of the XY scanning directions. Furthermore, the means for driving and vibrating is not limited to a method using coils and a magnet or a method using piezoelectric elements. Any other means for driving and vibrating may be used. The resonance frequency is not limited to being detected upon each scanning or at the start of driving the apparatus and may instead be detected at various times. For example, possible settings include one detection of the resonance frequency per a plurality of scans, one detection per day, or detection upon user instruction. The optical scanning method of the present disclosure is not limited to an endoscope apparatus and may also be adapted for use in another apparatus such as a microscope or a projector.

The invention claimed is:

1. An optical scanning method comprising:
   detecting a resonance frequency of a tip of a fiber while sweeping a vibration frequency of the tip of the fiber over a predetermined frequency range, the tip of the fiber being supported to allow oscillation;
   determining a driving frequency of the tip of the fiber on the basis of the detected resonance frequency; and
   scanning light over an object by causing the light to be emitted from the tip of the fiber while driving and vibrating the tip of the fiber at the driving frequency.

2. The optical scanning method of claim 1,
   wherein the scanning is consecutively repeated a plurality of times after detecting the resonance frequency and determining the driving frequency once.

3. The optical scanning method of claim 1,
wherein the detecting of the resonance frequency and the determining of the driving frequency are performed before the scanning each time the scanning is performed.

4. The optical scanning method of claim 1,
wherein an abnormality is detected as having occurred when the resonance frequency cannot be detected during the detecting of the resonance frequency.

5. The optical scanning method of claim 1,
wherein the resonance frequency is detected by detecting a phase difference between a current signal and a voltage signal for the driving and vibrating of the tip of the fiber.

6. An optical scanning method comprising:
detecting a resonance frequency of a tip of a fiber by detecting a phase difference between a current signal and a voltage signal for driving and vibrating the tip of the fiber, the tip of the fiber being supported to allow oscillation;
determining a driving frequency of the tip of the fiber on the basis of the detected resonance frequency; and
scanning light over an object by causing the light to be emitted from the tip of the fiber while performing the driving and vibrating of the tip of the fiber at the driving frequency.

7. The optical scanning method of claim 6,
wherein the resonance frequency is detected while sweeping a vibration frequency of the tip of the fiber over a predetermined frequency range.

8. The optical scanning method of claim 6,
wherein the scanning is consecutively repeated a plurality of times after detecting the resonance frequency and determining the driving frequency once.

9. The optical scanning method of claim 6,
wherein the detecting of the resonance frequency and the determining of the driving frequency are performed before the scanning each time the scanning is performed.

10. The optical scanning method of claim 6,
wherein an abnormality is detected as having occurred when the resonance frequency cannot be detected during the detecting of the resonance frequency.

11. An optical scanning apparatus comprising:
a fiber configured to guide light from a light source and emit the light from a tip of the fiber, the tip being supported to allow oscillation;
a driver configured to drive and vibrate the tip of the fiber;
a controller configured to sweep a vibration frequency of the tip of the fiber over a predetermined frequency range; and
a resonance frequency detector configured to detect a resonance frequency of the tip of the fiber while the vibration frequency is being swept over the predetermined frequency range by the controller,
wherein the controller is configured to determine a driving frequency of the tip of the fiber on the basis of the detected resonance frequency.

12. The optical scanning apparatus of claim 11,
wherein the resonance frequency detector is configured to detect a phase difference between a current signal from a current detection circuit and a voltage signal from a voltage detection circuit, the current signal and the voltage signal being for the driver to drive and vibrate the tip of the fiber.

13. An optical scanning apparatus comprising:
a fiber configured to guide light from a light source and emit the light from a tip of the fiber, the tip being supported to allow oscillation;
a driver configured to drive and vibrate the tip of the fiber;
a resonance frequency detector configured to detect a resonance frequency of the tip of the fiber by detecting a phase difference between a current signal from a current detection circuit and a voltage signal from a voltage detection circuit, the current signal and the voltage signal being for the driver to drive and vibrate the tip of the fiber; and
a controller configured to determine a driving frequency of the tip of the fiber on the basis of the detected resonance frequency.

14. The optical scanning apparatus of claim 13,
wherein the controller is configured to sweep a vibration frequency of the tip of the fiber over a predetermined frequency range, and
wherein the resonance frequency detector is configured to detect the resonance frequency while the vibration frequency is being swept over the predetermined frequency range by the controller.

* * * * *